(12) United States Patent
Blaesi

(10) Patent No.: US 9,742,917 B1
(45) Date of Patent: *Aug. 22, 2017

(54) CUSTOMER CALLBACK REWARD SYSTEM AND METHOD

(71) Applicant: West Corporation, Omaha, NE (US)

(72) Inventor: Duane Blaesi, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,107

(22) Filed: Feb. 10, 2015

Related U.S. Application Data

(63) Continuation of application No. 14/021,749, filed on Sep. 9, 2013, now Pat. No. 8,958,538, which is a continuation of application No. 13/674,994, filed on Nov. 13, 2012, now Pat. No. 8,548,148, which is a continuation of application No. 12/353,337, filed on Jan. 14, 2009, now Pat. No. 8,311,202.

(51) Int. Cl.
*H04M 3/42* (2006.01)
*H04M 3/523* (2006.01)

(52) U.S. Cl.
CPC ....... *H04M 3/5231* (2013.01); *H04M 3/5238* (2013.01)

(58) Field of Classification Search
USPC ............ 379/210.01, 265.01, 265.09, 266.01, 379/266.07, 309
See application file for complete search history.

(56) References Cited

U.S. PATENT DOCUMENTS

| | | | |
|---|---|---|---|
| 6,724,885 B1 * | 4/2004 | Deutsch .................. | H04M 3/48 379/209.01 |
| 2006/0256957 A1 * | 11/2006 | Fain ....................... | H04M 3/523 379/266.01 |
| 2007/0025530 A1 * | 2/2007 | Tidwell ................... | H04M 3/02 379/88.25 |

* cited by examiner

*Primary Examiner* — Quynh Nguyen

(57) ABSTRACT

A system, method and non-transitory computer readable medium including computer-executable instructions for handling calls. In an exemplary method of the disclosure, it may be determined whether a call should be transferred from the VSS to an agent based on, for example, agent availability or queue wait times. When it is determined to transfer the call to the agent, it may be determined whether a callback call should be offered to the caller. When it is determined to offer the callback call, one or more time blocks may be provided to which the caller can initiate the callback call to receive higher priority routing. Upon calling back into the system within one of the time blocks, the call may receive preferential routing treatment.

18 Claims, 3 Drawing Sheets

CUSTOMER CALLBACK REWARD SYSTEM AND METHOD

CROSS-REFERENCE TO RELATED APPLICATIONS

This application is a continuation from U.S. patent application Ser. No. 14/021,749, filed Sep. 9, 2013, and entitled "CUSTOMER CALLBACK REWARD SYSTEM AND METHOD", which is a continuation from U.S. patent application Ser. No. 13/674,994, filed Nov. 13, 2012, and entitled "CUSTOMER CALLBACK REWARD SYSTEM AND METHOD", now issued U.S. Pat. No. 8,548,148, which is a continuation from U.S. patent application Ser. No. 12/353,337, filed Jan. 14, 2009, entitled "CUSTOMER CALLBACK REWARD SYSTEM AND METHOD", now issued U.S. Pat. No. 8,311,202, each of which is incorporated by reference herein in its entirety.

TECHNICAL FIELD

The disclosure relates generally to a system and method for handling calls at a call center, and more particularly, to a system and method for rewarding a customer for calling back to a call center at a more appropriate time based on projected call volumes.

BACKGROUND OF THE INVENTION

Background Art

In a many business situations, call centers are resource constrained. Take for instance the scenario where a call center is fielding telephone calls but is populated with a finite number of agents and can, thus, handle only a certain volume of calls. The call center may experience drastically different usage patterns at any given time. As such, during a time of high volume calling, calls that are directed to the call center may cause a caller to wait extended periods of time before reaching a call center agent.

Various solutions have been proposed and used to route customers among call centers to alleviate waiting times for a customer. One proposed solution is a carrier-based network routing scheme which uses a fixed or static allocation percentage to define how calls are allocated among several call centers.

Further, many Automatic Call Distributor (ACD) vendors provide overflow routing between their own ACD systems. When one particular ACD approaches its maximum capacity, calls are redirected to another ACD that has a lighter call load.

Also, software-based telephony integration systems have been employed to create a virtual call center enterprise. Such systems may use open, distributed software architecture that manages voice and data distribution across an enterprise. The software processes a combination of customer and contact center data by using user-defined routing scripts that reflect a company's business rules. The software is then able to route each contact to the optimum resource anywhere in the enterprise. While related art software-based solutions may provide a robust solution to allocate calls efficiently within an enterprise, they are extremely expensive to deploy, and are suitable for only the largest of call centers.

Accordingly, the related art methods can be costly to implement or resource constrained. Thus, there is a need for a relatively low cost, robust system that is able to use callback logic to determine if a callback should be offered to a customer of a call center based on projected queue wait times rather than having the customer wait on the line for a call center agent. The system preferably requires little in the way of hardware to implement.

The illustrative aspects of the present disclosure are designed to solve the problems herein described and/or other problems not discussed.

BRIEF SUMMARY OF THE INVENTION

A first aspect of the disclosure provides a method for handling calls at one or more call centers. In the method, a call may be routed from a caller at the one or more call centers calls into a Voice Self Service (VSS). Then, it may be determined whether the call should be transferred from the VSS to an agent of the call center based on, for example, agent availability or queue wait times. When it is determined to transfer the call to the call center agent, it may be determined whether a callback call should be offered to the caller. When it is determined to offer the callback call, the method may include providing one or more time blocks to which the caller can initiate the callback call to receive higher priority routing. Upon calling back into the system within one of the time blocks, the call may receive preferential routing treatment.

A second aspect of the disclosure provides s system for handling calls at one or more call centers. The system may include a Voice Self Service (VSS) structured to receive and route a call from a caller at the one or more call centers calls; and a processor structured to determine whether the call received at the VSS should be transferred from the VSS to an agent of the call center. When it is determined to transfer the call to the call center agent, the processor may further be structured to determine a queue time for the call, and determine whether a callback call should be offered to the caller. When it is determined to offer the callback call, the processor is further structured to offer the callback call to the caller. Upon calling back into the system within an offered time block, the call may receive preferential routing treatment. The system may also include a memory communicably coupled to the processor, wherein the memory stores data and/or logic used by the processor.

A third aspect of the disclosure provides a non-transitory computer readable medium including computer-executable instructions for performing steps of the invention.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
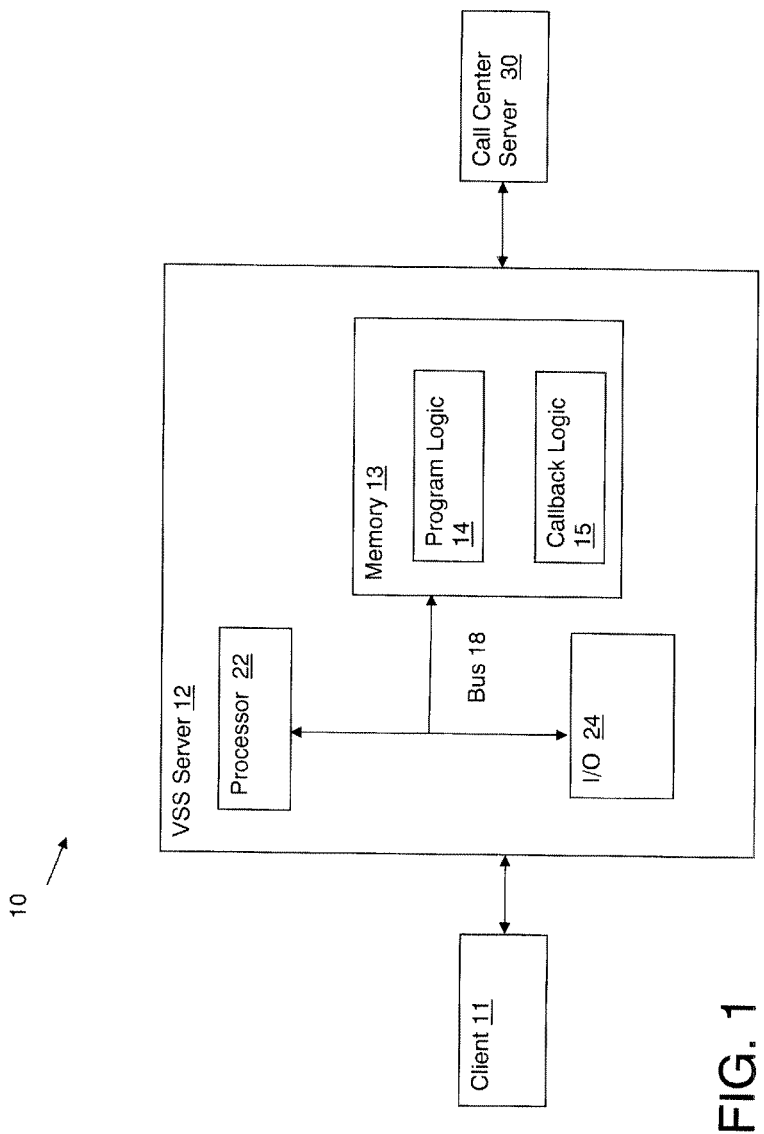
FIG. 1 shows a system for handling calls at one or more call centers according to an illustrative embodiment of the present invention.

As indicated above, the disclosure provides a system and method for rewarding a customer for calling back to a call center at a more appropriate time based on projected call volumes. FIG. 1 shows an illustrative embodiment of a system 10 for handling calls at one or more call centers. The illustrative system 10 includes a client 11, a Voice Self Service (VSS) server 12 having program logic 14 and callback logic 15 stored in memory 13, and a call center server 30.

The client 11 may include any computer architecture that will enable a caller to communicate in a network by receiving and sending calls, such as a cellular phone, a Personal Digital Assistant (PDA), a mainframe computer, a desktop computer, a handheld computer, a Voice over Internet Protocol (VoIP) station, etc.

VSS server 12 may further include a processor 22, an input/output (I/O) 24, and the memory 13 for storing at least one of the program logic 14 and callback logic 15 (e.g., as a program product that can be executed by processor 22). As is known in the art, in general, processor 22 executes computer program code that is stored in memory 13. While executing computer program code, processor 22 can read and/or write data, such as agent availability data and/or queue time data, to/from memory 13, and/or I/O interface 24. Bus 18 provides a communications link between each of the components in VSS server 12. I/O device 24 can comprise any device that enables a user to interact with VSS server 12 or any device that enables VSS server 12 to communicate with one or more other computing devices. Input/output devices (including but not limited to keyboards, displays, pointing devices, etc.) can be coupled to the system either directly or through intervening I/O controllers.

In any event, VSS server 12 can comprise any general purpose computing article of manufacture capable of executing computer program code installed by a user (e.g., a personal computer, server, handheld device, etc.). However, it is understood that VSS server 12 is only representative of various possible equivalent computing devices that may perform the various process steps of the disclosure. To this extent, in other embodiments, VSS server 12 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

It should be noted that while the VSS server 12 described in the illustrative embodiment of the invention shown in FIG. 1 is embodied as a server, separate from the call center server 30, the VSS server 12 could be, among others, (1) co-located on the same machine as the call center server 30, (2) on the same machine as the client 11, (3) on the same machine as both the client 11 and call center server 30, and/or (4) on a separate machine as shown.

Similarly, system 10 is only illustrative of various types of computer infrastructures for implementing the disclosure. For example, in one embodiment, system 10 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modems and Ethernet cards are just a few of the currently available types of network adapters. Regardless, communications between the computing devices may utilize any combination of various types of transmission techniques.

It is understood that some of the various systems shown in FIG. 1 can be implemented independently, combined, and/or stored in memory for one or more separate computing devices that are included in system 10. Further, it is understood that some of the systems and/or functionality may not be implemented, or additional systems and/or functionality may be included as part of system 10.

Referring again to FIG. 1, the call center server 30 may also include any computer architecture that will enable the call center server 30 to communicate in a network by receiving and sending signals. The call center server 30 may, for example, include similar architecture as described above for the VSS server 12.

Figure 2:
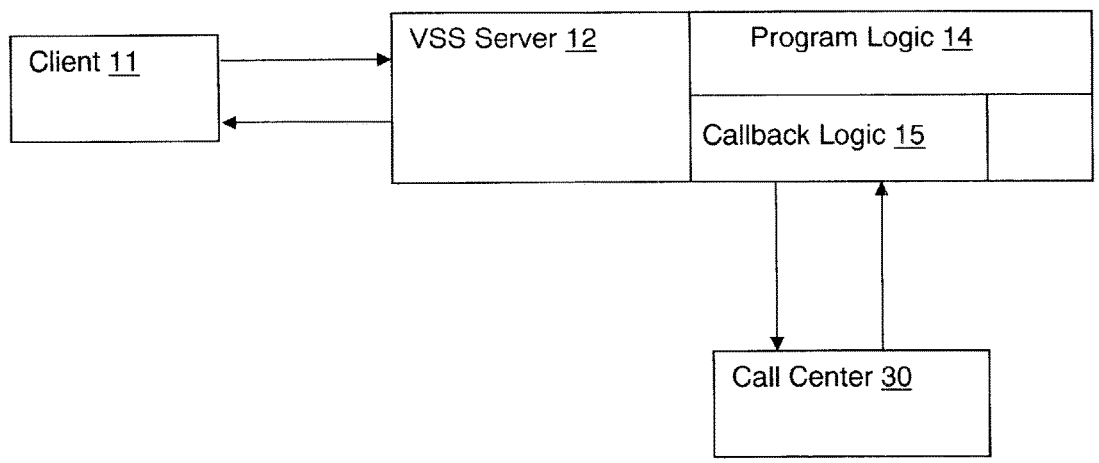
FIG. 2 shows a system and method for handling a call where a caller calls into the one or more call centers and accepts a callback opportunity according to an illustrative embodiment of the invention.

FIG. 2. shows a system and method for handling a call where a caller calls into the one or more call centers and accepts a callback opportunity according to an illustrative embodiment of the invention. In FIG. 2, a caller using client 11 calls into the VSS server 12 and the call proceeds through a program flow at program logic 14 until it is determined that the call should be transferred to a call center 30.

The program logic 14 then messages the callback logic 15 to determine whether a callback should be offered. Either in the callback logic 15 or from the system using agent information, a determination is made as to whether it would be more desirable to take a call later at the call center 30 when projected queue times will be less. If the program flow determines that now is a good time to handle the call, the call is routed to the call center 30.

If it is determined that later is a better time to handle the call, the VSS server 12 informs the caller that estimated queue times are high, and also provides a message to the caller such as "we can more efficiently handle your call at a later time, if you would like to schedule a time to call us back, we will make sure that your call is handled quickly when it arrives."

If the caller declines the offer to call back at a later time, then the call is directed on to the call center 30. If the caller accepts the callback offer, the program flow then offers the caller time blocks to which the caller can call back in and receive a higher priority routing. These time blocks may be determined by either the system with agent information or by logic 14, 15 on the VSS server 12 itself. The VSS server 12 may then play the caller a thank you message and then disconnect the caller.

Figure 3:
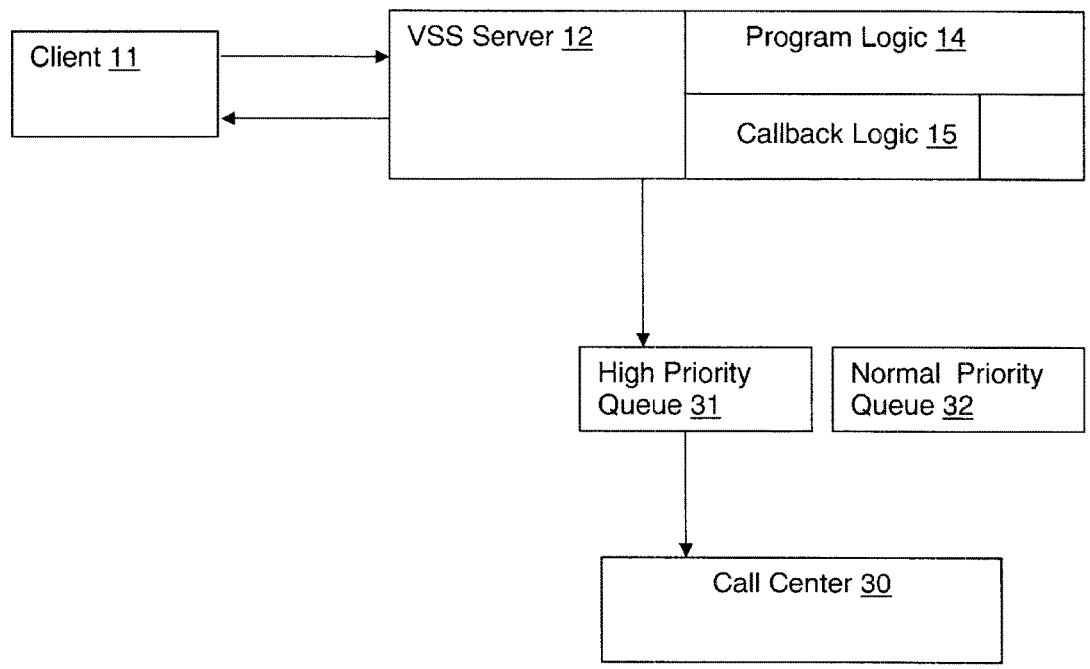
FIG. 3 shows a system and method for handling a call where a caller calls back into the system at a scheduled time to receive preferential call routing treatment according to an illustrative embodiment of the invention.

FIG. 3 shows a system and method for handling a call where a caller calls back into the system at a scheduled time to receive preferential call routing treatment according to an illustrative embodiment of the invention. When the caller calls back in during the appropriate time block, the VSS server 12 may determine that this is the same caller as before. This determination can be accomplished in a variety of ways, such as matching Automatic Number Identification (ANI) and/or account information, and/or accomplished by using Access Point Names (APNs).

The VSS server 12 may then play a message thanking the caller for calling back and inform the caller that they are receiving preferential call routing treatment. The VSS server 12 may then transfer the call with preferential routing. Preferential routing may be any system in which the call is routed with the opportunity to reach an agent faster. This may include, for example, placing the customer in a higher priority queue 31 and/or placing the customer in a queue 32 ahead of those already in the queue 32.

As will be appreciated by one skilled in the art, the present invention is preferably realized in a hardware device such as a computer, and in other embodiments, the present invention can be realized in hardware, software, firmware or a combination of hardware, software and/or firmware. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of systems and methods according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
  when it is determined to transfer a call from a caller via a Voice Self Service (VSS) server to an agent, determining whether a callback call should be offered to the caller;
  when it is determined to offer the callback call, informing the caller, by the VSS server, that estimated queue times are high and offering the callback call to the caller during one or more time blocks;
  when the callback call offer is declined by the caller, placing the call in a first queue for queuing callers to a call center;
  when the callback call offer is accepted by the caller, determining one or more time blocks to which the caller can initiate the callback call to receive higher priority routing;
  receiving the callback call and determining whether the callback call is from the caller of the call using one or more Access Point Names and is during one of the one or more time blocks; and
  when it is determined that the callback call is from the caller of the call and is during one of the one or more time blocks, placing the callback call into a callback queue for callback callers to the call center that is different to the first queue;
  wherein the callback queue has a higher priority than the first queue.

2. The method according to claim 1, wherein the queue time is determined based on at least one of program logic and agent availability.

3. The method according to claim 1, wherein when it is determined to offer the callback call, informing the caller, by the VSS server, that a call center can handle the call more efficiently at a later time.

4. The method according to claim 1, further comprising, when the caller declines the callback call, transferring the call to a queue.

5. The method according to claim 1, wherein the time blocks are determined by at least one of program logic and agent availability.

6. The method according to claim 1, wherein the determination of the caller of the callback call is based on at least one of matching Automatic Number Identification (ANI), and account information.

7. The method according to claim 1, further comprising, when it is determined that the callback call is from the caller of the call, informing the caller that the caller is receiving preferential routing treatment.

8. The method according to claim 1, wherein placing the callback call into the higher priority queue comprises placing the callback call into the higher priority queue ahead of other calls already in the higher priority queue.

9. A system, comprising:
a Voice Self Service (VSS) server structured to receive and route a call received from a caller;
a memory;
a processor communicably coupled to the memory, the processor structured to:
when it is determined to transfer a call from a caller via a Voice Self Service (VSS) server to an agent, determine whether a callback call should offered to the caller;
when it is determined to offer the callback call, inform the caller, by the VSS server, that estimated queue times are high and offer the caller the callback call during one or more time blocks;
when the callback call offer is declined by the caller, place the call in a first queue that queues callers to a call center;
when the callback call offer is accepted by the caller, determine one or more time blocks to which the caller can initiate the callback call to receive higher priority routing;
receive the callback call and determine whether the callback call is from the caller of the call using one or more Access Point Names and is during one of the one or more time blocks; and
when it is determined that the callback call is from the caller of the call and is during one of the one or more time blocks, place the callback call into a callback queue for callback callers to the call center that is different to the first queue;
wherein the callback queue has a higher priority than the first queue.

10. The system according to claim 9, wherein the memory stores at least one of program logic and agent availability data used by the processor to determine the queue time.

11. The system according to claim 9, wherein at least one of the VSS server and processor is structured to provide preferential routing treatment for the callback call including at least one of place the callback call into a higher priority queue and place the callback call into the queue ahead of other calls already in the queue.

12. A non-transitory computer readable medium including computer-executable instructions for:
when it is determined to transfer a call from a caller via a Voice Self Service (VSS) server to an agent, determining whether a callback call should be offered to the caller;
when it is determined to offer the callback call, informing the caller, by the VSS server, that estimated queue times are high and offering the callback call to the caller during one or more time blocks;
when the callback call offer is declined by the caller, placing the call in a first queue for queuing callers to a call center;
when the callback call offer is accepted by the caller, determining one or more time blocks to which the caller can initiate the callback call to receive higher priority routing;
receiving the callback call and determining whether the callback call is from the caller of the call using one or more Access Point Names and is during one of the one or more time blocks; and
when it is determined that the callback call is from the caller of the call and is during one of the one or more time blocks, placing the callback call into a callback queue for callback callers to the call center that is different to the first queue;
wherein the callback queue has a higher priority than the first queue.

13. The non-transitory computer readable medium according to claim 12, wherein the instructions determine the queue time based on at least one of program logic and agent availability.

14. The non-transitory computer readable medium according to claim 12, when the caller declines the callback call, the instructions are further for transferring the call to a queue.

15. The non-transitory computer readable medium according to claim 12, wherein the time blocks are determined by at least one of program logic and agent availability.

16. The non-transitory computer readable medium according to claim 12, wherein the determination of the caller of the callback call is based on at least one of matching Automatic Number Identification (ANI), and account information.

17. The non-transitory computer readable medium according to claim 12, further comprising, when it is determined that the callback call is from the caller of the call, informing the caller that the caller is receiving preferential routing treatment.

18. The non-transitory computer readable medium according to claim 12, wherein placing the callback call into the higher priority queue comprises placing the callback call into the higher priority queue ahead of other calls already in the higher priority queue.

* * * * *